United States Patent
Shibata et al.

(10) Patent No.: US 9,448,424 B2
(45) Date of Patent: Sep. 20, 2016

(54) OPTICAL MODULE AND OPTICAL MODULATION DEVICE

(71) Applicant: Fujitsu Optical Components Limited, Kawasaki-shi, Kanagawa (JP)

(72) Inventors: Kohei Shibata, Isehara (JP); Seimi Sasaki, Sagamihara (JP); Teruhiro Kubo, Kitahiroshima (JP); Shinji Maruyama, Sapporo (JP); Shintaro Takeuchi, Sapporo (JP); Hiroshi Kato, Kawasaki (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/629,913

(22) Filed: Feb. 24, 2015

(65) Prior Publication Data

US 2015/0253595 A1  Sep. 10, 2015

(30) Foreign Application Priority Data

Mar. 7, 2014  (JP) .................. 2014-044602

(51) Int. Cl.
| G02F 1/035 | (2006.01) |
| G02F 1/025 | (2006.01) |
| G02B 6/122 | (2006.01) |
| G02B 6/12  | (2006.01) |

(52) U.S. Cl.
CPC ............ *G02F 1/025* (2013.01); *G02B 6/122* (2013.01); *G02B 2006/12142* (2013.01)

(58) Field of Classification Search
None
See application file for complete search history.

(56) References Cited

U.S. PATENT DOCUMENTS

| 5,625,735 | A * | 4/1997 | Di Maggio | .......... G02B 6/3812 |
| | | | | 385/11 |
| 5,963,357 | A * | 10/1999 | Kubota | .................... G02F 1/225 |
| | | | | 359/239 |
| 6,354,747 | B1 | 3/2002 | Irie et al. | |
| 6,652,158 | B2 * | 11/2003 | Bartur | .................. G02B 6/4202 |
| | | | | 385/88 |
| 7,228,013 | B1 * | 6/2007 | Bramson | ................ G02B 6/126 |
| | | | | 385/122 |
| 7,376,312 | B2 | 5/2008 | Nawae et al. | |
| 2007/0177151 | A1 | 8/2007 | Isomura et al. | |
| 2010/0329600 | A1 | 12/2010 | Sugiyama | |
| 2012/0243862 | A1 | 9/2012 | Kinoshita | |
| 2013/0064553 | A1 | 3/2013 | Nakahara | |

FOREIGN PATENT DOCUMENTS

| JP | 11-186609   | 7/1999  |
| JP | 2004-157208 | 6/2004  |
| JP | 2007-201939 | 8/2007  |
| JP | 2011-007972 | 1/2011  |
| JP | 2012-199768 | 10/2012 |
| JP | 2012-211971 | 11/2012 |
| JP | 2013-061481 | 4/2013  |

OTHER PUBLICATIONS

Chinese Office Action dated Mar. 1, 2016 in corresponding Chinese Patent Application No. 201510087868.4.

\* cited by examiner

*Primary Examiner* — Sung Pak
(74) *Attorney, Agent, or Firm* — Staas & Halsey LLP

(57) ABSTRACT

An optical module connected to an optical fiber for transmitting light includes: a substrate; a ferrule that is formed from a material capable of transmitting therethrough light having a predetermined wavelength, accommodates an end of the optical fiber, and is fixed on the substrate with a fixing agent cured by being irradiated with the light capable of passing through the material; and a semiconductor chip that is disposed on the substrate and modulates light emitted from the end of the optical fiber accommodated in the ferrule.

9 Claims, 4 Drawing Sheets

OPTICAL MODULE AND OPTICAL MODULATION DEVICE

CROSS-REFERENCE TO RELATED APPLICATION

This application is based upon and claims the benefit of priority of the prior Japanese Patent Application No. 2014-044602, filed on Mar. 7, 2014, the entire contents of which are incorporated herein by reference.

FIELD

The embodiments discussed herein are related to an optical module and an optical modulation device.

BACKGROUND

In recent years, an optical phase modulation method such as a DP-QPSK (Dual Polarization Differential Quadrature Phase Shift Keying) method, for example, has been attracting attention in an optical transmission system. The DP-QPSK method is a method producing less deterioration during transmission and capable of achieving an increased capacity. The standardization thereof has been underway by the OIF (Optical Internetworking Forum).

An example of an optical modulator employing such an optical phase modulation method is an optical modulator which performs modulation with a semiconductor chip. Accurate optical coupling between an optical fiber and the semiconductor chip is expected for the optical modulater employing the semiconductor chip while it is capable of reducing its size when compared with an optical modulator employing a ferroelectric crystal such as lithium niobate ($LiNbO_3$), for example.

More specifically, whereas the beam diameter of a single-mode optical fiber is about 10 μm, for example, a beam diameter to be incident on the semiconductor chip is about 1 to 2 μm, for example. Thus, if a relative position between the optical fiber and the semiconductor chip is displaced, the accuracy of the optical coupling is reduced, thereby increasing the coupling loss thereof. Specifically, if a positional displacement amount between the optical fiber and the semiconductor chip is 0, the coupling loss therebetween is also 0 as indicated in FIG. 9, for example. If the positional displacement amount is about 0.3 μm, for example, on the other hand, the coupling loss of −1 dB is generated.

Since high-accuracy optical coupling is expected for the optical modulator employing the semiconductor chip as described above, it is desirable that the position of the optical fiber be fixed accurately. Specifically, when the optical fiber is fixed with solder, for example, it has been considered that the position of the optical fiber is measured with a laser micrometer so as to fix the optical fiber at an accurate position.

Patent Document 1: Japanese Laid-open Patent Publication No. 2004-157208

However, since solder has a melting point of at least 100° C. or higher, the temperature of the solder to be melted and solidified when fixing the optical fiber greatly differs from the temperature of an operating environment for the optical modulator which operates at a room temperature, for example. Thus, during the operation of the optical modulator, the position of the optical fiber fixed with the solder varies along with a volume change due to thermal expansion of the solder. Specifically, the solder contracts as it cools down after the solidification thereof, possibly resulting in a displacement in the position of the optical fiber fixed with the solder in the operating environment of the optical modulator.

In view of this, when the optical fiber is fixed with the solder, a method such that the positional variation due to the thermal expansion of the solder is measured in the course of fixing the optical fiber, then the solder is melted again, and the position of the optical fiber is adjusted is employed. Thus, there is a problem in that the number of steps is increased in order to fix the optical fiber with the solder and achieve high-accuracy optical coupling between the optical fiber and the semiconductor chip.

SUMMARY

According to an aspect of an embodiment, an optical module that is connected to an optical fiber for transmitting light includes: a substrate; a ferrule that is formed from a material capable of transmitting therethrough light having a predetermined wavelength, accommodates an end of the optical fiber, and is fixed on the substrate with a fixing agent that is cured by being irradiated with the light capable of passing through the material; and a semiconductor chip that is disposed on the substrate and modulates light emitted from the end of the optical fiber accommodated in the ferrule.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited by this embodiment.

Figure 1:
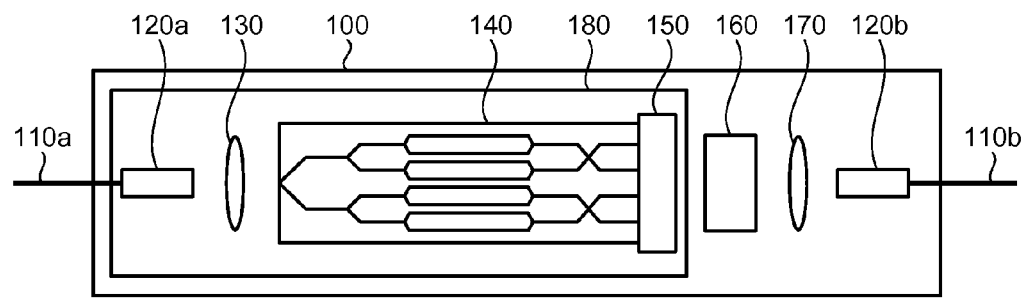
FIG. 1 is a diagram illustrating a configuration of an optical modulator according to one embodiment.

FIG. 1 is a diagram illustrating a configuration of an optical modulator 100 according to one embodiment. The optical modulator 100 illustrated in FIG. 1 is connected to optical fibers 110a and 110b. The optical modulator 100 includes: ferrules 120a and 120b; a lens 130; an optical modulation chip 140; a microlens array (hereinafter abbreviated as an "MLA") 150; a polarization coupling unit 160; a lens 170; and a substrate 180.

The ferrules 120a and 120b accommodate tips of the optical fibers 110a and 110b, respectively, and fix the positions of the optical fibers 110a and 110b. In the optical modulator 100 illustrated in FIG. 1, signal light is inputted from the optical fiber 110a and the ferrule 120a and the signal light is outputted from the ferrule 120b and the optical fiber 110b.

Moreover, the ferrule 120a is adhered to the substrate 180 with an adhesive cured by being irradiated with light having a predetermined wavelength. The ferrule 120a is formed from a material capable of transmitting therethrough the light having the wavelength which causes the curing of the adhesive. The ferrule 120a will be described later in detail.

The lens 130 condenses the signal light emitted from the tip of the optical fiber 110a accommodated in the ferrule 120a and then inputs the obtained light beam into the optical modulation chip 140. The lens 130 has a 5 to 10-power magnification, for example, in order to reduce connection loss by absorbing a difference between the mode field diameter of the optical fiber 110a and the beam diameter of the light beam to be incident on the optical modulation chip 140. Thus, the light beam emitted from the tip of the optical fiber 110a with a beam diameter of about 10 µm is converted into a light beam with a beam diameter of about 1 to 2 µm by the lens 130.

The optical modulation chip 140 is made of a semiconductor material. The optical modulation chip 140 splits the light beam inputted from the lens 130 into two and superimposes an electric signal on each of the light beams. The optical modulation chip 140 then outputs the two light beams to the polarization coupling unit 160 via the MLA 150. Moreover, the optical modulation chip 140 outputs a monitoring light beam for monitoring an operation of the optical modulation chip 140 in addition to the two light beams on which the electric signal is superimposed.

The MLA 150 converts the light beams on which the electric signal is superimposed by the optical modulation chip 140 into parallel light and outputs the parallel light toward the polarization coupling unit 160. In other words, the MLA 150 outputs two parallelly-traveling light beams to the polarization coupling unit 160. The two light beams outputted by the MLA 150 have the same polarization direction.

The polarization coupling unit 160 combines together the two light beams outputted from the MLA 150 and outputs a light beam containing two polarizations having polarization directions perpendicular to each other. More specifically, the polarization coupling unit 160 first rotates the polarization direction of one of the light beams outputted from the MLA 150, combines the light beam with the other one of the light beams, and outputs the obtained single light beam.

The lens 170 causes the light beam outputted from the polarization coupling unit 160 to be irradiated on the tip of the optical fiber 110b accommodated in the ferrule 120b.

The substrate 180 has the ferrule 120a, the lens 130, the optical modulation chip 140, and the MLA 150 mounted thereon. As will be described later, a temperature of the substrate 180 is kept constant by a temperature controller. The positions of the mounted components are thereby prevented from varying due to a temperature change.

Figure 2:
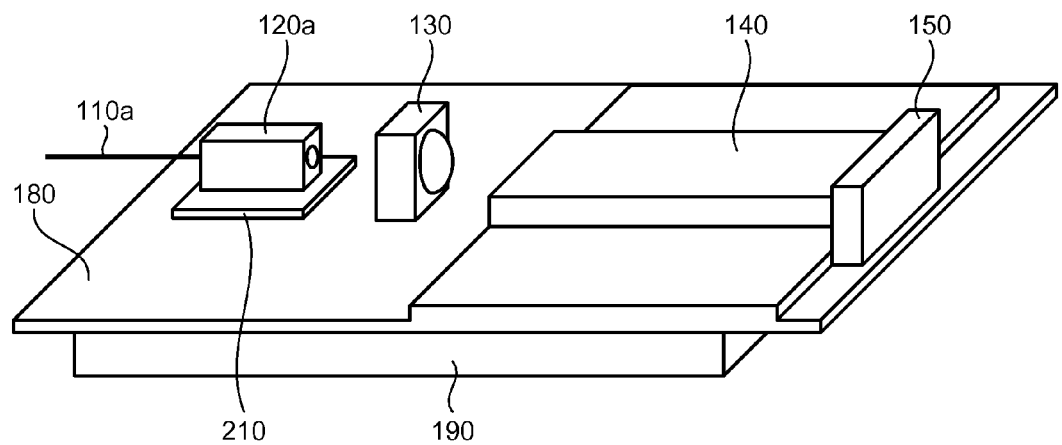
FIG. 2 is a perspective view illustrating a configuration on a substrate according to one embodiment.

FIG. 2 is a perspective view illustrating a configuration on the substrate 180 according to one embodiment. As illustrated in FIG. 2, the substrate 180 is disposed on a temperature controller 190. The ferrule 120a, the lens 130, the optical modulation chip 140, and the MLA 150 are mounted on the substrate 180.

The optical modulation chip 140 is disposed on a portion of the substrate 180 raised in a board shape and the light beam used for optical modulation enters through a surface thereof on the side of the optical fiber 110a. The beam diameter of this light beam is about 1 to 2 µm, for example. Thus, the optical modulation chip 140 is small in size when compared with a ferroelectric crystal such as lithium niobate (LiNbO$_3$). Therefore, the optical modulator 100 can be reduced in size.

On the other hand, high-accuracy optical coupling between the optical fiber 110a and the optical modulation chip 140 is expected. According to the present embodiment, after the optical modulation chip 140 is disposed on the substrate 180, the ferrule 120a and the lens 130 are adhered onto the substrate 180. This allows the position of the optical fiber 110a to be optimally adjusted according to the position of the optical modulation chip 140, thereby achieving high-accuracy optical coupling between the optical fiber 110a and the optical modulation chip 140.

A structure and an adhering method of the ferrule 120a will now be described below specifically.

The ferrule 120a is formed from a material, such as a borosilicate glass, capable of transmitting therethrough ultraviolet (UV) having a wavelength of about 360 nm, for example. The ferrule 120a accommodates the tip of the optical fiber 110a therein. A surface of the ferrule 120a on the side of the lens 130 (hereinafter referred to as a "front surface") is polished together with an end face of the optical fiber 110a to form a flush surface. Here, in order to prevent the light emitted from the optical fiber 110a from being reflected and returned into the optical fiber 110a, the front surface of the ferrule 120a and the end face of the optical fiber 110a may be polished at an angle so as to make the emitting direction of the light beam different from the extending direction of the optical fiber 110a. In this case, the lens 130 is disposed such that an optical axis thereof is generally parallel to the emitting direction of the light beam. Specifically, an angle made by the optical axis of the lens 130 and the emitting direction of the light beam preferably falls within ±3 degrees.

The ferrule 120a is adhered to the substrate 180 with a UV adhesive cured by UV irradiation. In other words, the ferrule 120a is fixed at a position defined by a UV adhesion layer 210 and therefore realizes high-accuracy optical coupling between the optical fiber 110a and the optical modulation chip 140. As described above, since the ferrule 120a is formed from a UV transmitting material, the UV adhesive can be cured by irradiating the ferrule 120a with UV from a surface opposite to the adhering surface when the ferrule 120a is adhered to the substrate 180. More specifically, the ferrule 120a with the UV adhesive applied to the adhering surface thereof is disposed according to the position of the optical modulation chip 140. When UV is irradiated on the ferrule 120a from the above, UV transmits through the ferrule 120a and cures the UV adhesive on the adhering surface. As a result, the ferrule 120a is fixed on the UV adhesion layer 210.

At this time, by adjusting an amount of the UV adhesive applied to the adhering surface, the height of the UV adhesion layer 210 can be adjusted and thus the height of the ferrule 120a can be controlled in a highly accurate manner. Moreover, since the UV adhesive is cured by UV irradiation, there is no need to apply heat thereto when the ferrule 120a is adhered, and thus there is no need to consider the influence of a volume change due to thermal expansion. In other words, since the temperature of the UV adhesion layer 210 does not greatly vary between at the time of making the ferrule 120a adhered and at the time of operating the optical modulator 100, high-accuracy optical coupling can be achieved once the ferrule 120a is fixed by the UV irradiation.

Figure 3:
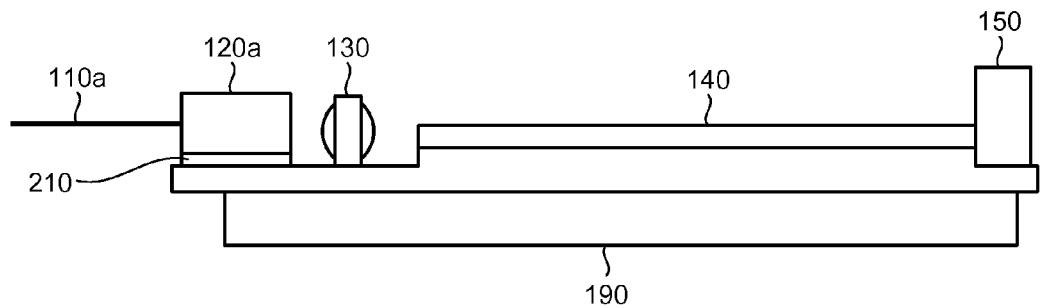
FIG. 3 is a side view illustrating the configuration on the substrate according to one embodiment.

Furthermore, according to the present embodiment, the temperature controller 190 is disposed below the substrate 180 so as to be in contact therewith as illustrated in FIG. 3. More specifically, the temperature controller 190 is in contact with the rear surface of the substrate 180 opposite to the surface on which the components such as the ferrule 120a are mounted. The temperature of the substrate 180 is kept constant by the temperature controller 190. Therefore, the temperature of the UV adhesion layer 210 is also kept constant and thus no expansion or contraction occurs in the UV adhesion layer 210. Therefore, positional displacement of the ferrule 120a can be minimized.

Figure 4:
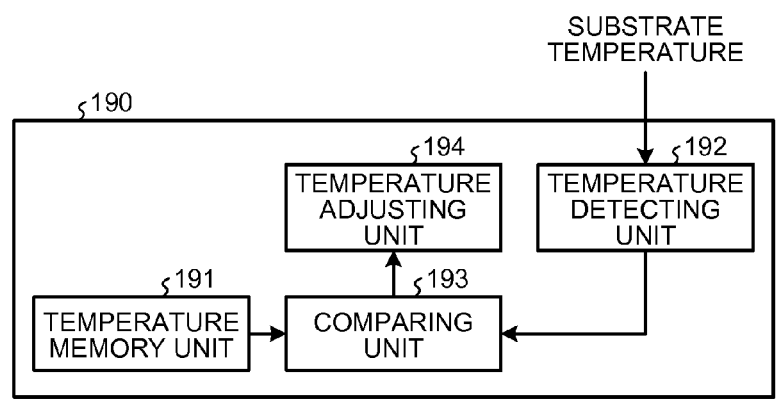
FIG. 4 is a block diagram illustrating a configuration of a temperature controller according to one embodiment.

FIG. 4 is a block diagram illustrating a configuration of the temperature controller 190 according to one embodiment. As illustrated in FIG. 4, the temperature controller 190 includes a temperature memory unit 191, a temperature detecting unit 192, a comparing unit 193, and a temperature adjusting unit 194.

The temperature memory unit 191 stores a specified temperature specified as the temperature of the substrate 180 by an administrator or the like, for example. The temperature detecting unit 192 includes a resistor whose resistance value is varied according to temperatures, such as platinum and a thermistor, for example. The temperature detecting unit 192 monitors the temperature of the substrate 180 and notifies the comparing unit 193 of the detected temperature. The comparing unit 193 compares the specified temperature stored by the temperature memory unit 191 and the temperature notified of by the temperature detecting unit 192. The comparing unit 193 causes the temperature adjusting unit 194 to adjust the temperature of the substrate 180 according to the comparison result. The temperature adjusting unit 194 includes an element capable of heat generation or cooling such as a resistance heating element and a Peltier element, for example. The temperature adjusting unit 194 increases or decreases the temperature of the substrate 180 in accordance with an instruction from the comparing unit 193.

The thus configured temperature controller 190 cools the substrate 180 when the temperature of the substrate 180 is higher than the specified temperature stored by the temperature memory unit 191. When the temperature of the substrate 180 is lower than the specified temperature, on the other hand, the temperature controller 190 heats the substrate 180. As a result, the temperature of the substrate 180 is converged to a temperature equal to the specified temperature and kept constant.

Figure 5:
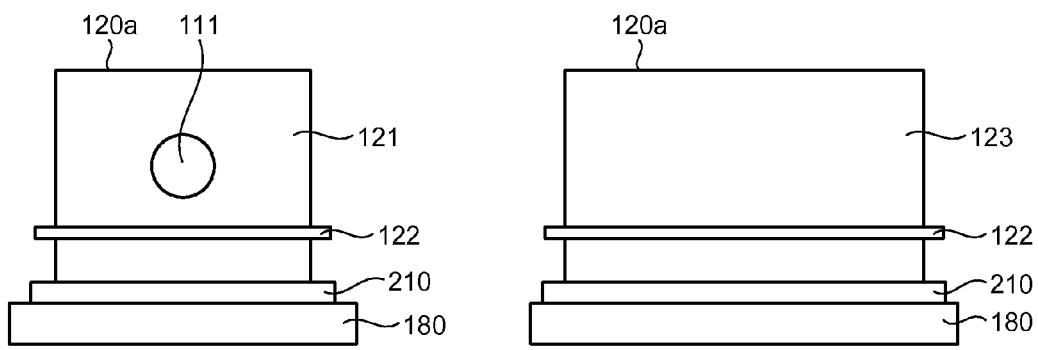
FIG. 5 is a diagram illustrating one example of a configuration of a ferrule according to one embodiment.
Figure 6:
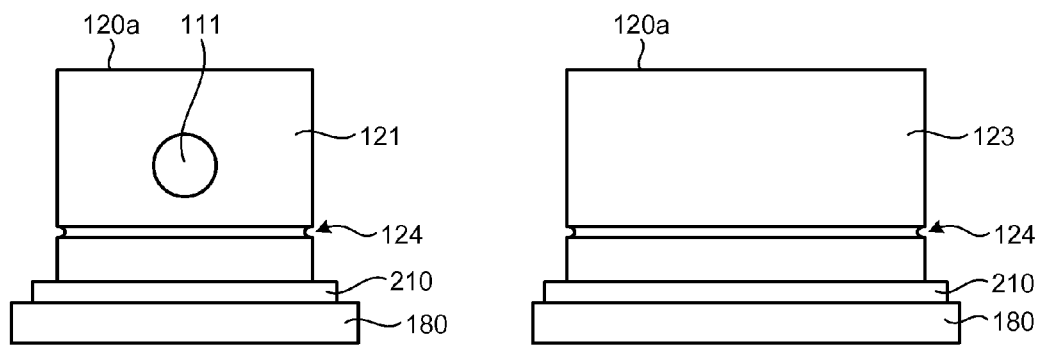
FIG. 6 is a diagram illustrating another example of the configuration of the ferrule according to one embodiment.
Figure 7:
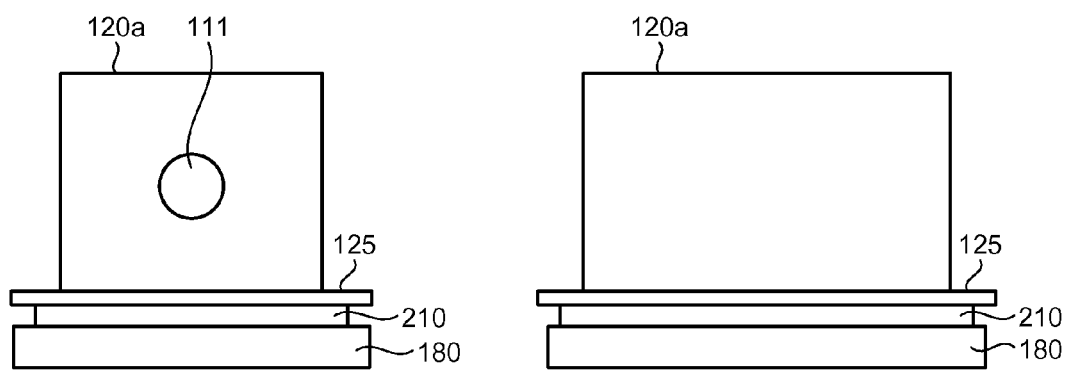
FIG. 7 is a diagram illustrating still another example of the configuration of the ferrule according to one embodiment.

A configuration of the ferrule 120a according to one embodiment will be described next with specific examples. FIGS. 5 to 7 are diagrams each illustrating a specific example of the configuration of the ferrule 120a according to one embodiment.

As described above, the ferrule 120a is formed from a UV transmitting material. When the ferrule 120a is adhered to the substrate 180, the UV adhesive applied to the adhering surface is irradiated with UV via the ferrule 120a. As a result, the UV adhesion layer 210 is formed between the ferrule 120a and the substrate 180 and the position of the ferrule 120a in a height direction thereof is defined according to the thickness of the UV adhesion layer 210. Here, there is a case where the UV adhesive runs off the edge of the adhering surface depending on the amount of the UV adhesive applied to the adhering surface of the ferrule 120a. If the amount of the UV adhesive running off the edge is large, the UV adhesive running off the edge may move upward along a side surface of the ferrule 120a, possibly resulting in covering the end face of the optical fiber 110a, or the like, for example.

In view of this, it is preferable that the ferrule 120a be provided with a structure for suppressing the influence of the UV adhesive running off the edge of the adhering surface in the present embodiment. As one example, a protruding portion 122 may be provided in the ferrule 120a as illustrated in FIG. 5, for example, in order to prevent the UV adhesive running off the edge of the adhering surface from moving upward. More specifically, while an end face 111 of the optical fiber 110a is exposed at a front surface 121 of the ferrule 120a, the protruding portion 122 is provided at a position closer to the substrate 180 than the end face 111 as illustrated in a left diagram of FIG. 5. This makes it possible to block, by means of the protruding portion 122, the UV adhesive running off the edge of the adhering surface and moving upward along the front surface 121 when the ferrule 120a is adhered. As a result, the end face 111 of the optical fiber 110a is prevented from being covered with the UV adhesive. Thus, the emitting of the light beam from the optical fiber 110a is not inhibited.

Moreover, the protruding portion 122 may be continuous up to a side surface 123 of the ferrule 120a or may surround the ferrule 120a as illustrated in a right diagram of FIG. 5. This prevents the UV adhesive from moving upward beyond the protruding portion 122. Thus, the UV adhesive running off the edge of the adhering surface can be prevented from interfering with other components, etc.

As another example, the ferrule 120a may be provided with a groove portion 124 as illustrated in FIG. 6, for example, in order to prevent the UV adhesive running off the edge of the adhering surface from moving upward. More specifically, the recessed groove portion 124 is provided at a position closer to the substrate 180 than the end face 111 of the optical fiber 110a exposed at the front surface 121 of the ferrule 120a as illustrated in a left diagram of FIG. 6. This makes it possible to block, by means of the groove portion 124, the UV adhesive running off the edge of the adhering surface and moving upward along the front surface 121 when the ferrule 120a is adhered. As a result, the end face 111 of the optical fiber 110a is prevented from being covered with the UV adhesive. Thus, the emitting of the light beam from the optical fiber 110a is not inhibited.

Moreover, the groove portion 124 may be continuous up to the side surface 123 of the ferrule 120a or may surround the ferrule 120a as illustrated in a right diagram of FIG. 6. This prevents the UV adhesive from moving upward beyond the groove portion 124. Thus, the UV adhesive running off the edge of the adhering surface can be prevented from interfering with other components, etc.

As still another example, the ferrule 120a may be provided on a base 125 and the base 125 may be adhered to the substrate 180 as illustrated in FIG. 7, for example. More specifically, as illustrated in a left diagram and a right diagram of FIG. 7, the ferrule 120a is provided on the base 125 having an area larger than the bottom surface of the ferrule 120a and the base 125 is adhered to the substrate 180. This prevents the UV adhesive running off the edge of the adhering surface when the base 125 is adhered to the substrate 180 from reaching the ferrule 120a. As a result, the end face 111 of the optical fiber 110a is prevented from being covered with the UV adhesive. Thus, the emitting of the light beam from the optical fiber 110a is not inhibited.

Note that the base 125 is obviously formed from a UV transmitting material as in the ferrule 120a. When the base 125 is adhered to the substrate 180, the ferrule 120a and the base 125 are irradiated with UV from above. Alternatively, the base 125 may be integrally formed with the ferrule 120a.

As just described, the ferrule 120a includes the structure for preventing the UV adhesive running off the edge of the adhering surface from moving upward along the side surface and covering the end face 111 of the optical fiber 110a. In the meantime, the reason why the UV adhesive runs off the edge of the adhering surface lies in that the UV adhesive in an excessive amount is applied to the adhering surface. In view of this, the substrate 180 may be provided with a structure for supplying an appropriate amount of UV adhesive to the adhering surface.

Figure 8:
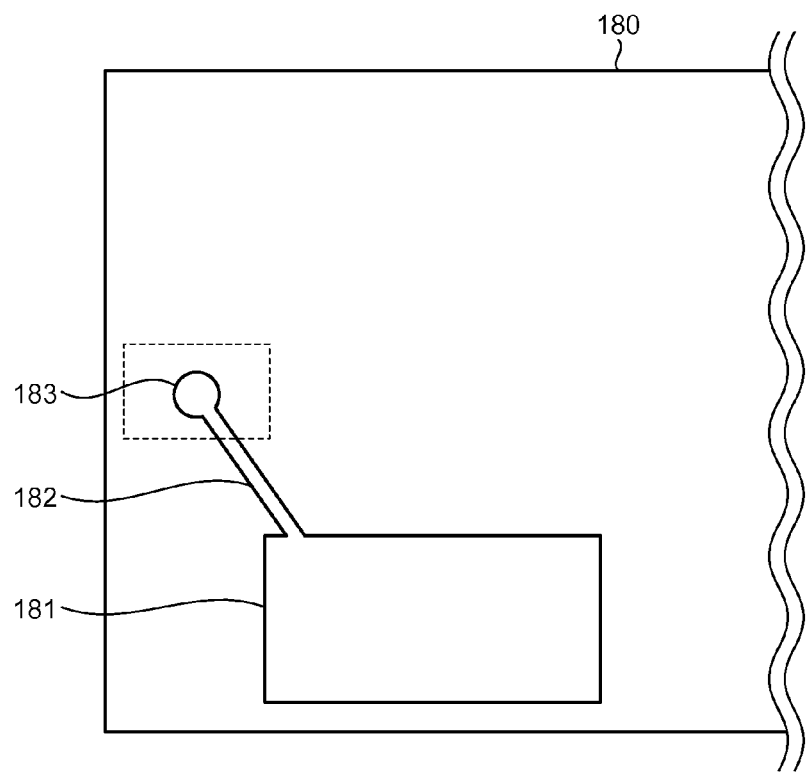
FIG. 8 is a diagram illustrating one example of a configuration of a substrate according to one embodiment.
Figure 9:
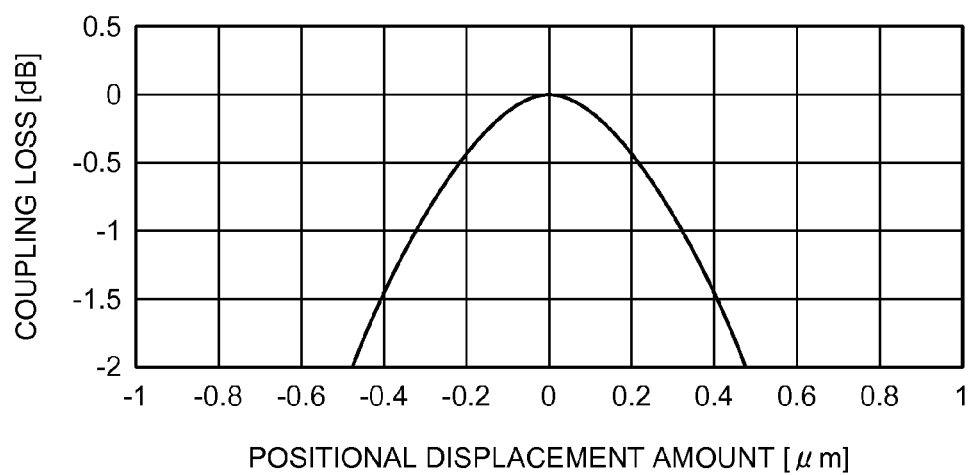
FIG. 9 is a diagram representing one example of a relationship between a positional displacement amount and a coupling loss.

Specifically, the substrate 180 includes an adhesive reservoir 181, a guiding groove 182, and an adhesive supplying unit 183 as illustrated in FIG. 8.

The adhesive reservoir 181 is a depressed portion formed by indenting a portion of the substrate 180 where no components are disposed. The adhesive reservoir 181 holds the UV adhesive therein. The UV adhesive is in a liquid state having relatively high viscosity at a stage prior to being cured by UV. Therefore, the UV adhesive can be held in the adhesive reservoir 181.

The guiding groove 182 is an elongated groove connecting between the adhesive reservoir 181 and the adhesive supplying unit 183. The guiding groove 182 guides the UV adhesive held in the adhesive reservoir 181 to the adhesive supplying unit 183.

The adhesive supplying unit 183 is a depressed portion formed by indenting a place where the ferrule 120a is adhered, which is indicated by a broken line in the figure. The adhesive supplying unit 183 supplies the UV adhesive guided by the guiding groove 182 to the bottom surface of the ferrule 120a.

When the ferrule 120a is adhered to the thus configured substrate 180, the UV adhesive guided to the adhesive supplying unit 183 is applied to the bottom surface of the ferrule 120a first. Then, the bottom surface of the ferrule 120a is moved away from the substrate 180 while adjusting the position of the ferrule 120a. At this time, due to the cohesion of the UV adhesive and a capillary action, the UV adhesive in an amount that fills up a space between the bottom surface of the ferrule 120a and the substrate 180 is transferred from the adhesive reservoir 181 through the guiding groove 182 and is supplied from the adhesive supplying unit 183. Thus, an appropriate amount of UV adhesive according to the distance between the bottom surface of the ferrule 120a and the substrate 180 is supplied from the adhesive supplying unit 183. Therefore, the UV adhesive can be prevented from excessively running off the edge of the adhering surface.

As described above, according to the present embodiment, the ferrule accommodating the tip of the optical fiber is formed from a UV transmitting material, and is adhered to the same substrate as the optical modulation chip with the adhesive cured by UV irradiation. Accordingly, the volume change of the adhesion layer between at the time of making the ferrule adhered and at the time of operating the optical modulator due to thermal expansion can be made small. Thus, the position of the ferrule does not change. Once the ferrule is fixed by the UV irradiation, no positional displacement between the tip of the optical fiber accommodated in the ferrule and the optical modulation chip occurs. High-accuracy optical coupling can be therefore achieved while suppressing an increase in the number of steps.

Although the ferrule 120a is adhered to the substrate 180 with the UV adhesive in one embodiment as described above, the lens 130, the MLA 150, and the like, may be adhered to the substrate 180 with the UV adhesive. In this case, the lens 130 and the MLA 150 may be provided with a structure similar to the protruding portion 122, the groove portion 124, or the base 125 illustrated in FIGS. 5 to 7. Alternatively, the structure for supplying the UV adhesive illustrated in FIG. 8 may be provided for the lens 130 and the MLA 150.

Moreover, although the UV adhesive cured by UV irradiation is used in one embodiment as described above, a UV adhesive cured also by heat may be used. With the use of the UV adhesive cured by UV irradiation or heating, after the position of the ferrule 120a is fixed by the UV irradiation first, a portion of the UV adhesive on which UV is not sufficiently irradiated can be cured by heating.

Furthermore, the adhesive for use in adhering the ferrule 120a is not limited to the UV adhesive. Any other photo-curable fixing agent employing a photo-curable resin cured by light other than UV may be used. In this case, the ferrule 120a is formed from a material capable of transmitting therethrough light for curing the photo-curable fixing agent.

According to one aspect of the optical module and the optical modulation device disclosed by the present application, an effect of achieving high-accuracy optical coupling can be obtained while suppressing an increase in the number of steps.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module connected to an optical fiber for transmitting light, comprising:
   a substrate;
   a fixing agent layer that is formed on the substrate and is cured by being irradiated with light having a predetermined wavelength
   a ferrule that is formed from a material capable of transmitting therethrough the light having the predetermined wavelength, accommodates an end of the optical fiber, and is fixed on the fixing agent layer; and
   a semiconductor chip that is disposed on the substrate and modulates light emitted from the end of the optical fiber accommodated in the ferrule wherein
   the fixing agent layer defines a position of the ferrule in a height direction thereof according to thickness of the fixing agent layer.

2. The optical module according to claim 1, further comprising:
   a first lens that condenses the light emitted from the end of the optical fiber and causes the light to be incident on the semiconductor chip; and
   a second lens that converts light to be emitted from the semiconductor chip into parallel light, wherein the substrate includes the first lens and the second lens mounted thereon.

3. The optical module according to claim 2, wherein at least one of the first lens and the second lens is fixed on the substrate with a fixing agent same as the fixing agent for fixing the ferrule on the substrate.

4. The optical module according to claim 1, further comprising a temperature controller that keeps a temperature of the substrate constant, wherein
the temperature controller includes:
   a detecting unit that detects a temperature of the substrate;
   a comparing unit that compares the temperature detected by the detecting unit with a predetermined temperature; and
   an adjusting unit that adjusts the temperature of the substrate according to a comparison result obtained by the comparing unit.

5. The optical module according to claim 1, wherein the ferrule includes a surface at which an end face of the optical fiber is exposed and a protruding portion that protrudes from the surface at a position closer to the substrate than the end face of the optical fiber exposed at the surface.

6. The optical module according to claim 1, wherein the ferrule includes a surface at which an end face of the optical fiber is exposed and a groove portion that is recessed from the surface at a position closer to the substrate than the end face of the optical fiber exposed at the surface.

7. The optical module according to claim 1, wherein the ferrule is placed on a base having an area larger than a bottom surface of the ferrule and is fixed on the fixing agent layer via the base.

8. The optical module according to claim 1, wherein the substrate includes:
   a first depressed portion that is formed by indenting a place where no components are disposed;
   a second depressed portion that is formed by indenting a place where the ferrule is disposed; and
   an elongated groove portion that connects between the first depressed portion and the second depressed portion.

9. An optical modulation device connected to a first optical fiber and a second optical fiber for transmitting light, comprising:
   a substrate;
   a fixing agent layer that is formed on the substrate and is cured by being irradiated with light having a predetermined wavelength;
   a first ferrule that is formed from a material capable of transmitting therethrough the light having the predetermined wavelength, accommodates an end of the first optical fiber, and is fixed on the fixing agent layer;
   a semiconductor chip that is disposed on the substrate and modulates light emitted from the end of the first optical fiber accommodated in the first ferrule;
   a combining unit that combines together a plurality of light beams obtained through modulation by the semiconductor chip; and
   a second ferrule that accommodates an end of the second optical fiber at a position where a light beam combined by the combining unit is incident, wherein
   the fixing agent layer defines a position of the ferrule in a height direction thereof according to thickness of the fixing agent layer.

* * * * *